United States Patent Office 2,829,123
Patented Apr. 1, 1958

2,829,123

VULCANIZATION OF BUTYL RUBBER BY 2,6-DI-(ALKOXYMETHYL) - 4 - HYDROCARBYL PHENOLS

Pliny O. Tawney, Passaic, N. J., assignor to United States Rubber Company, New York, N. Y., a corporation of New Jersey No Drawing. Application September 27, 1955
Serial No. 537,044

4 Claims. (Cl. 260—62)

This invention relates to a new method of vulcanizing Butyl rubber by means of (A) certain phenolic compounds in conjunction with (B) heavy metal halides, and also to improve Butyl rubber vulcanizates made with such compounds.

According to the invention, Butyl rubber is vulcanized by heating with (A) a 2,6-di(alkoxymethyl)-4-hydrocarbylphenol, which may be represented by the formula

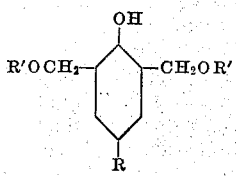

wherein R is a hydrocarbon radical (e. g., an alkyl, aryl, aralkyl or cycloalkyl radical) and R' is an alkyl radical which contains not more than four carbon atoms, and (B) a heavy metal halide. The resulting vulcanizates have remarkable resistance to oxidation and to exposure to elevated temperatures, and they have other desirable physical properties. It was surprising to find that the stated dialkoxymethyl-phenolic compounds, in the presence of heavy metal halides, will produce such improved Butyl rubber vulcanizates, because it has formerly been thought necessary to have methylol groups on the phenolic nucleus in order to vulcanize Butyl rubber. The unexpectedness of the results obtained with the present vulcanizing system is further emphasized by the fact that the described dialkoxymethyl-phenolic compounds will not vulcanize Butyl rubber in the absence of the heavy metal halide. Butyl rubber cured by this new method is superior in several important properties to Butyl rubber cured by the corresponding dimethylol phenol and a metallic halide.

Butyl rubber, or GR–I, is a generic name for any of the well known synthetic rubbery copolymers of an isoolefin with a minor amount of a conjugated diolefin. The isoolefins used generally have from 4 to 7 carbon atoms, and such isomonoolefins as isobutylene and 2-methyl-2-butene are preferred. The diolefins used have from 4 to 8 carbon atoms. Isoprene and butadiene are the most important of these diolefins; others are piperylene; 2,3-dimethylbutadiene; 3-methyl-1,3-pentadiene; 2-methyl-1,3-pentadiene; 1,3-hexadiene and 2,4-hexadiene. The Butyl rubber typical contains from about 0.5 to 5%, and seldom more than 10%, of copolymerized diolefin on the total weight of the elastomer. This relatively small amount of unsaturation renders the behavior of Butyl rubber toward vulcanizing agents fundamentally different from the behavior of the more highly unsaturated rubbers, such as natural rubber or GR–S, and therefore experience with such highly unsaturated rubbers affords no basis for predicting the behavior of Butyl rubber toward a given vulcanizing agent.

Typical specific 2,6-di(alkoxymethyl)-4-hydrocarbyl-phenols employed in the invention are 2,6-di(methoxymethyl) - 4 - methylphenyl; 2,6 - di(methoxymethyl)-4-ethylphenol; 2,6 - di(methoxymethyl) - 4 - isopropylphenol; 2,6 - di(methoxymethyl) - 4 - tert - butylphenol; 2,6 - di(methoxymethyl) - 4 - tert,tert-octylphenol; 2,6-di(methoxymethyl) - 4 - dodecylphenol; 2,6 - di(methoxymethyl) - 4 - phenylphenol; 2,6 - di(methoxymethyl)-4 - benzylphenol; 2,6 - di(methoxymethyl) - 4 - cyclohexylphenol; 2,6 - di(ethoxymethyl) - 4 - tert - butylphenol; 2,6-di(propoxymethyl)-4-tert-butylphenol; 2,6-di-(isopropoxymethyl)-4-tert-butylphenol; and 2,6-di(n-butoxymethyl)-4-tert-butylphenol.

The amount of 2,6-di(alkoxymethyl)-4-hydrocarbylphenol employed in the invention usually ranges from about 2 parts (by weight) to about 12 parts per 100 parts of the Butyl rubber. In general, a preferred range of dialkoxymethylphenol curing agent is from about 4 parts to 8 parts per 100 of the rubber.

The heavy metal halide—which may be regarded as a kind of catalyst or activator or curing supplement, since the dialkoxymethylphenol itself will not cure the Butyl rubber—is usually used in amount of at least 0.5 part, and I preferably use about 1 to 3 parts, per 100 parts of the Butyl rubber. Although in some cases even larger amounts of the metal halide can be used, say 10 parts, it is not generally necessary or desirable to use appreciably more than about 5 parts. In the majority of cases I limit the heavy metal halide to 5 parts or less, and I may even limit it to 1 or 2 parts at times. I customarily use a large amount of the heavy metal halide, e. g., from 5 to 10 parts, when I wish to cure the Butyl very rapidly at a low temperature, e. g., 100° C.

The heavy metal halides employed are exemplified by such known stable acidic halides as tin chloride, zinc chloride, iron chloride, and, in general, halides of the various metals usually classified as heavy metals (cf. the periodic chart of the elements in "Introductory College Chemistry" by H. G. Deming, published by John Wiley and Sons, Inc.). This class includes, inter alia, chromium chloride and nickel chloride, as well as cobalt chloride, manganese chloride and copper chloride. Although the copper halides may be used, I prefer not to use them because of the possible deleterious effect of the copper on the Butyl rubber. The heavy metal chlorides constitute the preferred class of activators or vulcanization adjuvants, although the heavy metal salts of other halides including bromine, fluorine, and iodine (such as stannic iodide) may also be used. Of the heavy metal chlorides, the most preferred are those of tin, iron and zinc. The heavy metal halides are effective independently of the state of oxidation of the metal, and they are even effective if the halide is partially hydrolyzed, or is only a partial halide, as in zinc oxychloride.

In carrying out the invention, the Butyl rubber, the 2,6-di(alkoxymethyl) - 4 - hydrocarbylphenol, and the heavy metal halide, and any additional desired ingredients, may be mixed together in any desired order according to the procedures ordinarily used in mixing rubber compounds, with the aid of the usual rubber mixing equipment, such as an internal mixer or a roll mill.

The vulcanizable mixture resulting from the foregoing ingredients may be fabricated into the desired form by the usual methods, such as calendering, extrusion, or molding, and subsequently vulcanized by heating, preferably while confined under pressure.

Preferably carbon black is present in the products made by the process of this invention. As is well known, carbon black greatly improves the tensile strength, abrasion resistance and other properties of sulfur-cured Butyl rubber as compared to the respective properties of similarly cured gum Butyl rubber. This improvement likewise is conferred by carbon black on Butyl rubber which is cured by the method of this invention. However, for certain products this improved tensile strength, etc., is not needed. Therefore, in its broadest aspect this invention relates to the cure of gum Butyl rubber and to Butyl rubber which contains other fillers, e. g., clays, titanium dioxide, etc., as well as to black-filled Butyl rubber.

The cure is conveniently carried out at temperatures of 100° C. or more, and preferably at temperatures in excess of 150° C., for periods of time ranging from about 5 minutes to 3 hours, the longer periods of time within the stated time range being employed with the lower temperature. The most preferred curing temperatures are within the range of about 160° C. to 190° C., although somewhat higher temperatures may be employed, e. g., 200° to 205° C., provided that such high temperatures are not maintained long enough to cause thermal injury to the article. The time and temperature chosen for a particular cure not only are related inversely to each other but also are dependent on the amount of catalyst used. Therefore, the time and temperature of cure can be given only in the broad ranges shown above. Any skilled rubber compounder can easily determine conventionally the proper curing conditions for any particular stock.

The process of this invention is useful in making cured Butyl rubber products which resist aging at high temperatures in steam and/or air extremely well. Typical products are curing bags, steam hose, gaskets for equipment which must remain at high temperatures continuously or intermittently for long periods of time, belts, inner tubes, tires, motor mountings, flexible hot air ducts, hot water bottles, etc. The cured products may also be kept in contact with copper or silver articles, which would be tarnished by Butyl rubber products cured by, or containing, sulfur.

The present vulcanizing agents are made from the corresponding 2,6-dimethylol-4-hydrocarbylphenols in two steps by the method of Barthel—J. prakt. Chem. 161, 77–80 (1942), and Ber. 76, 573–4 (1943). In the first step any of the said class of phenols is heated for a few hours with an excess of, say, acetic anhydride, to form the corresponding 2,6-di(acetoxymethyl)-4-hydrocarbyl- phenyl acetate. The acetic acid formed in the reaction and the excess acetic anhydride are evaporated in high vacuo. The residue, without further purification, is treated with an excess of sodium hydroxide dissolved in the appropriate alcohol in the presence of a small amount of water, for several days at room temperature. The 2,6-di(alkoxymethyl)-4-hydrocarbylphenol so formed is isolated by fractional distillation in vacuo. My preferred vulcanizing agent, 2,6-di(methoxymethyl)-4-tert-butylphenol, boils at 90° C. at 0.03 mm. Hg has a refractive index ($n_D^{20.5}$) of 1.5113, and melts at 17° C. It will be understood that any and all of the vulcanizing agents employed in the invention may be prepared by the foregoing procedure, starting with appropriate corresponding known materials.

The following example illustrates the invention. All parts are by weight.

Example

A masterbatch was mixed on a rubber mill in the proportion of 100 parts of GR-I 15 (a copolymer of isobutylene:isoprene, 98:2, according to Rubber Age 74, 561 (1954)), 50 parts of carbon black, 2 parts of stearic acid and 5 parts of Indopol H300 (a commercially available polybutene sold as a plasticizer for rubbers). Stannous chloride dihydrate and 2,6-di(methoxymethyl)-4-tert-butylphenol were then mixed with individual portions of the masterbatch on the mill to form a series of stocks which differed among themselves only in the amount of the curing agent. Portions of these stocks were cured in 6" x 6" x 0.1" molds under pressure at 161° C. (322° F.) for the individual times shown. The stocks then were tested conventionally, as shown, to determine the extent of cure and resistance to aging.

| Stock | | 1 | 2 | 3 | 4 |
|---|---|---|---|---|---|
| Masterbatch | | 157 | 157 | 157 | 157 |
| SnCl$_2$.2H$_2$O | | 1.8 | 1.8 | 1.8 | 1.8 |
| 2,6-Di(methoxymethyl)-4-tert-butylphenol | | 2 | 4 | 6 | 8 |
| | Cure (min.) | | | | |
| Green Tests: | | | | | |
| Tensile Strength (p. s. i.) | 15 | 770 | 1,340 | 1,370 | 1,300 |
| | 30 | 1,130 | 1,600 | 1,460 | 1,630 |
| | 60 | 1,490 | 1,600 | 1,790 | 1,840 |
| | 120 | 1,640 | 1,730 | 1,940 | 1,850 |
| Elongation (percent) | 15 | 460 | 490 | 570 | 680 |
| | 30 | 410 | 400 | 410 | 560 |
| | 60 | 380 | 310 | 370 | 440 |
| | 120 | 340 | 280 | 320 | 350 |
| 100% Modulus (p. s. i.) | 15 | 150 | 180 | 150 | 130 |
| | 30 | 200 | 230 | 200 | 180 |
| | 60 | 230 | 300 | 250 | 230 |
| | 120 | 280 | 380 | 350 | 280 |
| Aging Tests (60-minute cures): | | | | | |
| Tensile Strength (p. s. i.)— | | | | | |
| green | | 1,490 | 1,600 | 1,790 | 1,840 |
| aged 3 days in steam [a] | | 1,290 | 1,420 | 1,660 | 1,620 |
| aged 24 hrs. in air [b] | | 1,120 | 1,530 | 1,350 | 1,390 |
| aged 48 hrs. in air | | 860 | 1,330 | 1,310 | 1,250 |
| Elongation (percent)— | | | | | |
| green | | 380 | 310 | 370 | 440 |
| aged 3 days in steam | | 290 | 190 | 230 | 240 |
| aged 24 hrs. in air | | 260 | 150 | 100 | 80 |
| aged 48 hrs. in air | | 300 | 180 | 140 | 120 |
| 100% Modulus (p. s. i.)— | | | | | |
| green | | 230 | 300 | 250 | 230 |
| aged 3 days in steam | | 290 | 420 | 440 | 410 |
| aged 24 hrs. in air | | 270 | 700 | | |
| aged 48 hrs. in air | | 230 | 560 | 950 | 950 |

[a] All steam aging tests were made at 164° C. (85 p. s. i. of steam).
[b] All air aging tests were made at 177° C. with air circulating throughout the test.

This example shows that 2,6-di(alkoxymethyl)-4-tert-butylphenols cure Butyl rubber in the presence of stannous chloride, and that the cured products resist aging in steam and air extremely well.

Having thus described my invention, what I claim and desire to protect by Letters Patent is:

1. A method of vulcanizing a synthetic rubbery copolymer of an isoolefin having from 4 to 7 carbon atoms with from 0.5 to 10% of a conjugated diolefin having from 4 to 8 carbon atoms, comprising heating 100 parts by weight of the said rubber at a temperature of from 100° C. to 205° C. for from 5 minutes to 3 hours, in admixture with (A) from 2 to 12 parts of a 2,6-di-(alkoxymethyl)-4-hydrocarbylphenol, wherein the said hydrocarbyl is selected from the group consisting of alkyl, aryl, aralkyl and cycloalkyl radicals, and wherein each alkoxy group contains no more than four carbon atoms, and (B) from 0.5 to 10 parts of a heavy metal halide.

2. A method of vulcanizing a synthetic rubber copolymer of isobutylene with from 0.5 to 10% of isoprene, comprising heating 100 parts by weight of said rubber at a temperature of from 150° C. to 205° C. for from 5 minutes to 3 hours, in admixture with from 4 to 8 parts of 2,6-di(methoxymethyl)-4-tert-butylphenol and from 1 to 5 parts of a heavy metal chloride.

3. An improved vulcanizate characterized by resistance to deterioration at elevated temperatures comprising 100 parts by weight of a synthetic rubbery copolymer of an isoolefin having from 4 to 7 carbon atoms with (A) from 0.5 to 10% of a conjugated diolefin having from 4 to 8 carbon atoms, vulcanized with from 2 to 12 parts of a 2,6-di(alkoxymethyl)-4-hydrocarbylphenol, wherein the said hydrocarbyl is selected from the group consisting of alkyl, aryl, aralkyl and cycloalkyl radicals, and wherein each alkoxy group contains no more than four carbon atoms, and (B) from 0.5 to 10 parts of a heavy metal halide.

4. An improved vulcanizate characterized by resistance to oxidation at elevated temperatures comprising 100 parts by weight of a synthetic rubbery copolymer of isobutylene with from 0.5 to 10% of isoprene, vulcanized with from 4 to 8 parts of 2,6-di(methoxymethyl)-4-tert-butylphenol and from 1 to 5 parts of a heavy metal chloride.

References Cited in the file of this patent
UNITED STATES PATENTS 2,726,224    Peterson et al.            Dec. 6, 1955

OTHER REFERENCES

Van der Meer: Rubber Chem. Tech., 18, pages 853–873 (1945).